Dec. 19, 1933.  R. STRESAU  1,939,732

WELDED FLOOR STRUCTURE

Filed June 23, 1930  3 Sheets-Sheet 1

INVENTOR.
Richard Stresau
BY
ATTORNEY.

Dec. 19, 1933.   R. STRESAU   1,939,732
WELDED FLOOR STRUCTURE
Filed June 23, 1930   3 Sheets-Sheet 2
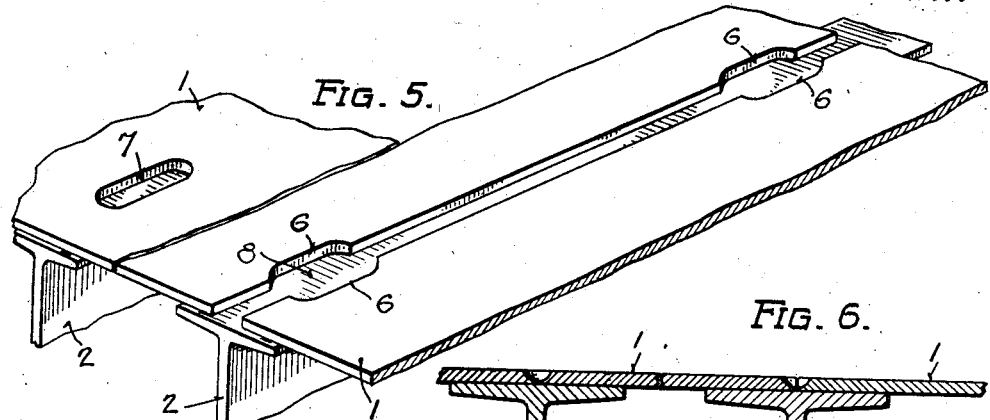
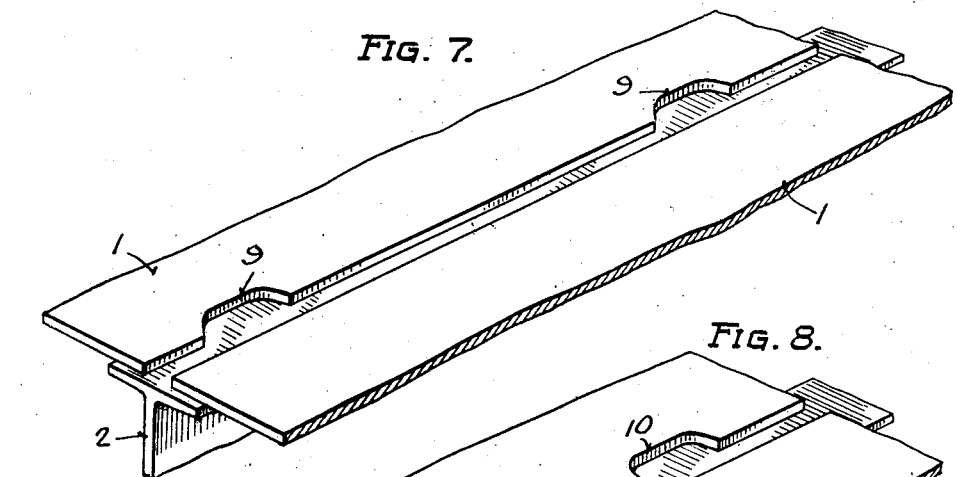
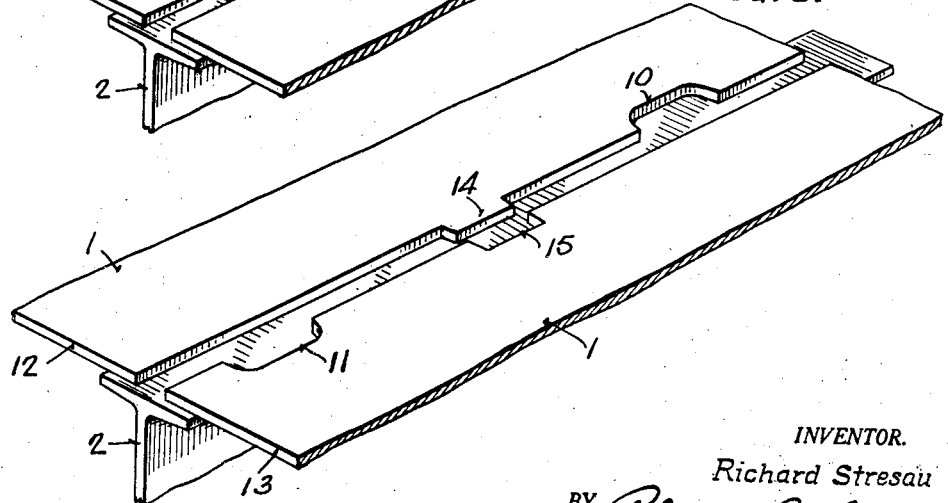
INVENTOR.
Richard Stresau
BY
ATTORNEY.

Dec. 19, 1933.      R. STRESAU      1,939,732
WELDED FLOOR STRUCTURE
Filed June 23, 1930      3 Sheets-Sheet 3
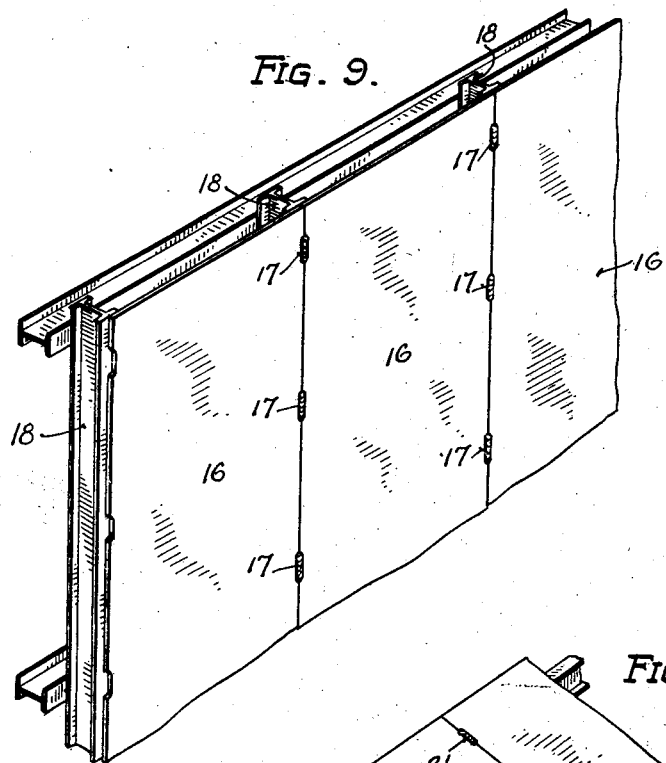
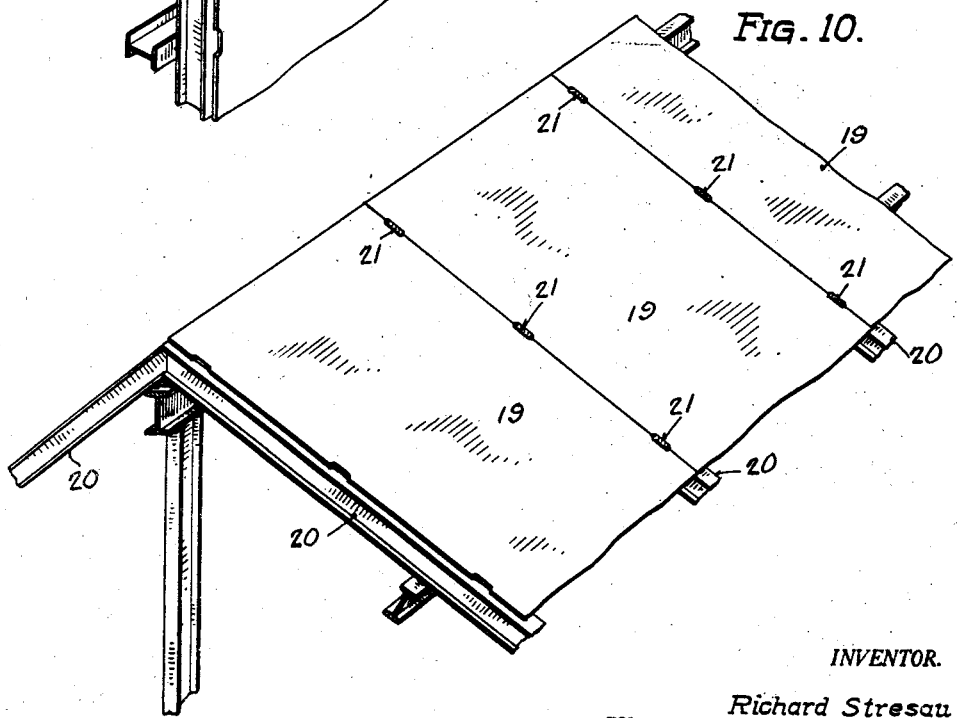
INVENTOR.
Richard Stresau
BY
ATTORNEY.

Patented Dec. 19, 1933

1,939,732

UNITED STATES PATENT OFFICE 1,939,732

WELDED FLOOR STRUCTURE

Richard Stresau, Wauwatosa, Wis., assignor to A. O. Smith Corporation, Milwaukee, Wis., a corporation of New York Application June 23, 1930. Serial No. 463,063

9 Claims. (Cl. 189—34)

This invention relates to novel construction of the enclosing and dividing elements of buildings or the like, including outside walls, roofs, inner walls, floorings and ceilings.

An object of the invention is to provide a welded structure in which the elements are joined in such manner that no injurious stresses are set up in them as a result of the welding operation.

The invention consists generally in the structures and combinations hereinafter described and particularly pointed out in the claims.

In accordance with the invention, a welded structure is made by joining flat plates to stringers by welding at independent areas. The welded areas are so spaced that the plates are not warped during the welding operation and the welds are of such combined strength that the resulting structure functions to resist bending loads as a unitary beam.

The accompanying drawings illustrate embodiments of the invention and the views thereof are as follows:

Fig. 5 is a perspective view of parts of two adjoining plates illustrating the preferred manner in arranging the notches, the plates being shown spaced from each other for the sake of clearness.

Fig. 6 is a transverse section of adjoining plates showing a modified form of notch in the edges thereof.

Fig. 7 is a view similar to Fig. 5 showing a modified form and arrangement of the notches.

Fig. 8 is a view similar to Fig. 5 showing another modified form and arrangement of the notches.

Fig. 9 is a perspective view illustrating the application of the invention to the side walls of a building.

Fig. 10 is a perspective view illustrating the application of the invention to the roof of a building.

Figure 1:
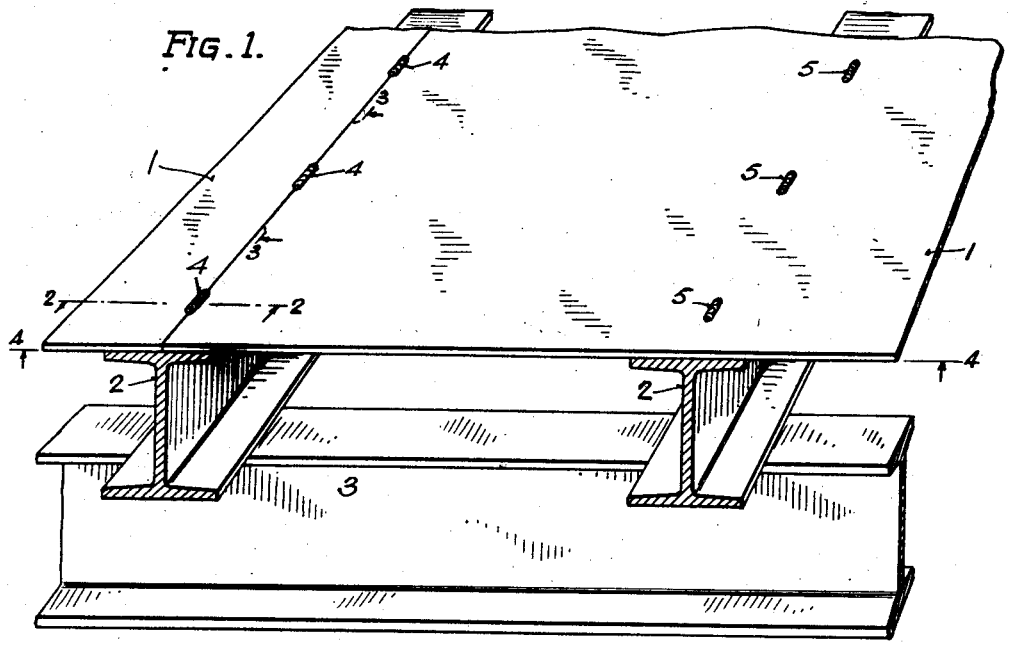
Figure 1 is a perspective view of a welded floor in a building.
Figure 2:
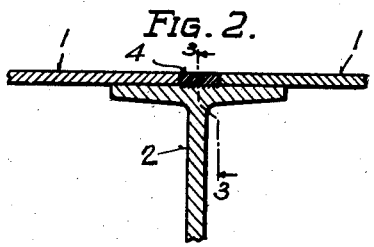
Fig. 2 is a transverse section on line 2—2 of Fig. 1.
Figure 3:
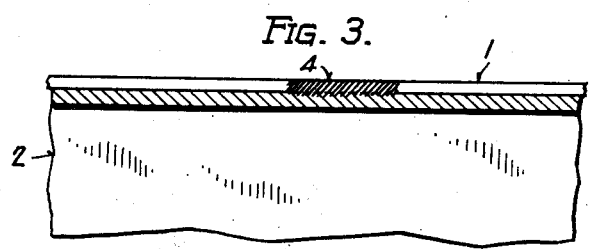
Fig. 3 is a longitudinal section on line 3—3 of Figs. 1 and 2.
Figure 4:
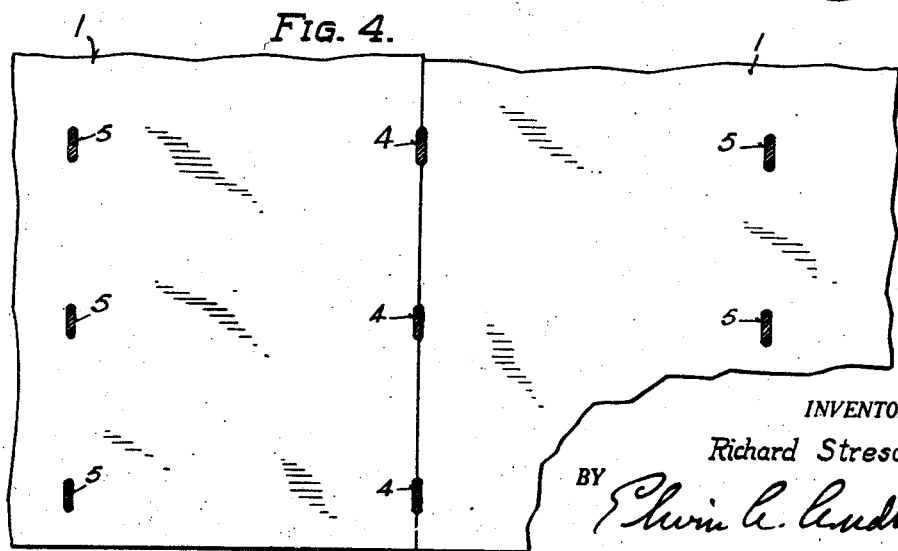
Fig. 4 is a horizontal section on line 4—4 of Fig. 1.

In the construction of welded metal floors for buildings, as illustrated in Figs. 1 to 8 inclusive, the floor is fabricated from a plurality of sheet metal floor plates 1 arranged in abutting relation edge to edge to provide a continuous metal floor. The plates are supported on metal I-beams or stringers 2 which may form part of the structural frame work 3 of the building or which may be supported in any suitable manner.

The plates 1 are welded to each other and to the respective stringers 2 at a plurality of points or regions 4 spaced along the abutting edges of the plates and also at a plurality of points or regions 5 spaced along the stringer in the central portion of the plates. The welds or regions 4 and 5 comprise deposited weld metal lying in openings in or through the plates 1 and fused with the metal of the plates surrounding the respective openings and with the metal of the stringers 2 upon which the plates rest.

The welding of the plates is preferably accomplished by the metallic arc welding process wherein a rapid concentrated heating of the parts is obtained in each local region being welded. Because of the spacing of the welding regions, relatively high speed welding operations may be followed without danger of setting up injurious residual stresses and strains in the metal plates. Other processes of welding may be employed such as gas welding, electric resistance welding, and atomic hydrogen welding.

The spacing of the weld regions 4 and 5 and the cross-sectional area of the welds are such that the welds are capable of transmitting the maximum shear stresses which occur between the plates 1 and the flanges of the stringers 2 when the structure is loaded as a beam. When joined in this manner, the plates and the stringers cooperate as a unitary beam structure in resisting bending forces, the plates functioning as the outside element at one side of the unitary beam. The neutral axis of the combined structure is nearer to the attached plates than is the neutral axis of any one of the stringers taken alone.

To ensure an adequate factor of safety, the welds may be made somewhat stronger than the minimum strength, determined in any suitable manner, necessary to resist the shear stresses occurring in the structure when it is loaded as a unitary beam. However, the spacing and size of the welds are kept within such limits that no internal stresses of sufficient magnitude to warp the plates or to seriously weaken the structure are set up within the plates during the welding operation.

The welds shown in the drawings are spaced approximately twelve inches apart along the stringers as illustrative of the correct distance in the case of a particular structure made in accordance with the invention. The exact distance may vary considerably with different structures.

In order to prevent the deposited weld metal from protruding above the upper surface of the floor, and in order to insure a proper penetration of the weld and fusion of the deposited metal with the metal of the floor plates 1 and stringers 2, it is preferable to provide notches 6 in the edges of the plates and openings 7 in the central portions of the plates for receiving the deposited metal, as shown in Fig. 5.

The notches 6 in the adjoining plates are preferably made to align with each other whereby they cooperate to provide openings 8 at the abutting edges similar to the openings 7 in the central portions of the plates.

The openings 7 and 8 are spaced laterally from each other approximately the distance between centers of the stringers and longitudinally from each other in accordance with the determined required distance for the welded points 4 and 5, respectively.

The openings are preferably of such size as to accommodate the required amount of deposited weld metal, those illustrated being about three-eighths of an inch wide and two inches long, the floor plates being about three-sixteenths of an inch thick.

The openings need not extend entirely through the floor plates, but may be in the form of short depressions or recesses, as shown in Fig. 6, having a thin lip or welding dam at the bottom to prevent escape of deposited metal at the beginning of the welding operation. This dam should be sufficiently thin, however, to allow the required penetration of welding heat and fusion of weld metal with the metal of the stringers.

In fabricating the metal floor, it is preferable to have the edges of the plates 1 meet directly above the center of a stringer 2, as illustrated in the drawings, in order to provide a balanced construction for the stringers.

In the modification illustrated in Fig. 7, the notches 9 are formed in only one of the meeting edges, and are of a size equal to the required opening for the joint, the edge of the adjacent plate being plain without notches.

In Fig. 8, the notches 10 and 11 are cut in the edges of adjoining plates 12 and 13, respectively, and are staggered relative to each other whereby the notches along the abutting edges alternate in the respective plates, each notch being of a size equal to the required opening for the joint.

In this view, the plates 12 and 13 are shown to be interlocked by projections 14 along their respective edges (between the notches 10 and 11) which projections extend into complementary recesses 15 in the opposite edges. This interlocking construction strengthens the floor against torsional stresses which tend to make the respective plates move relative to each other either in a longitudinal or a lateral direction, and to thereby prevent excessive shearing stresses in the welded joint.

Fig. 9 illustrates the application of the invention to the construction of metal side walls for the building, it being understood that substantially the same construction may be employed for the walls or ceiling of a room in the building.

In Fig. 9, the metal sheets 16 are welded as at intervals 17 to metal studding 18. In this instance the shear value and the spacing of the welds may be such as to develop the full required strength of the studding 18, having consideration for the stresses set up by, and the tendency of the building to move in accordance with, wind pressure and the like.

Fig. 10 illustrates a construction of metal roofs in which the roof plates 19 are welded to rafters 20 at a plurality of spaced points or regions 21 in accordance with the invention.

While the present invention provides a welded metal floor or wall obtaining the advantages of a unitary beam and at the same time preventing undesirable excessive residual stresses and strains in the floor plates, perhaps a more outstanding accomplishment of the invention from a practical standpoint lies in the rapidity with which the present floor may be fabricated. For instance, with the construction illustrated, a single welder employing the manual arc welding process may weld the seams at a rate substantially in excess of 500 feet per hour as distinguished from the rate approximating ninety feet per hour as claimed by those employing manual or automatic machine welding in the continuous welding of seams in metal floors. The difficulties of continuous automatic machine welding, caused by misalignment of the seams between consecutive pairs of plates, the irregularities in and difficulty of spacing the edges of the plates, and the setting up of the automatic machine to travel along each seam, are entirely overcome by the present invention.

Another saving by the use of the present invention lies in the preparation of the plates. The plates may be made of a width suitable to span a number of stringers, thereby requiring the planing of a less number of edges. For instance, where the plates span the distance between four stringers, only two edges need be planed instead of six, as is required where continuous welding is employed. The cutting or punching of the openings in the plates may be accomplished in a single simple operation of a suitable press without distorting the plates.

Various modifications may be employed within the scope of the accompanying claims.

I claim:

1. A fabricated structure comprising spaced stringers, plates bridging the stringers, the edges of said plates meeting over a stringer, spaced openings at such edges, and weld metal deposited in the spaced openings forming the only means of uniting the plates to each other and to the stringers for the purpose of forming an integral structure.

2. A fabricated structure comprising spaced stringers, plates carried by the stringers, the plates straddling some of the stringers and meeting over other stringers and having spaced openings therein located over the stringers, weld metal deposited in the spaced openings, said weld metal being the only means uniting the plates and stringers into an integral structure, the spaced deposits of weld metal being of sufficient strength to transmit the stresses when the welded structure is subjected to a load to cause the plates to cooperate with the stringers to function as a beam structure.

3. A structural element of the class described, comprising in combination a series of metal members suitably supported and arranged in spaced parallel relation, a plurality of metal plates arranged in a common plane upon said members with the lines of their meeting edges resting upon the approximate surfaces of said members, said plates being provided with openings arranged at intervals and adjacent to the surfaces of said members, and weld metal deposited in said openings only securing said plates to said members, certain of the openings being formed as notches in the edges of the plates.

4. A structural element of the class described, comprising in combination a series of metal members suitably supported and arranged in spaced parallel relation, a plurality of metal plates arranged in a common plane upon said members with the lines of their meeting edges resting upon the approximate surfaces of said members, said plates being provided with openings arranged at intervals and adjacent to the surfaces of said members, and weld metal deposited in said openings only securing said plates to said members, the plates being of a width to span a plurality of the members and secured to the intermediate members by weld metal arranged in openings in the plates over said members and the meeting edges of the plates being secured to the under-lying members by weld metal deposited in notches in the edges of the plates.

5. A structural element of the class described, comprising in combination a series of metal members suitably supported and arranged in spaced parallel relation, a plurality of metal plates arranged in a common plane upon said members with the lines of their meeting edges resting upon the approximate surfaces of said members, said plates being provided with openings arranged at intervals and adjacent to the surfaces of said members, and weld metal deposited in said openings only securing said plates to said members, certain of the openings being formed as notches in the edges of the plates and the meeting edges of the plates between said openings being formed to provide interlocking elements whereby said plates are interlocked with each other.

6. A structural element of the class described, comprising in combination a series of metal members suitably supported and arranged in spaced parallel relation, a plurality of metal plates arranged in a common plane upon said members with the lines of their meeting edges resting upon the approximate surfaces of said members, said plates being provided with openings arranged at intervals and adjacent to the surfaces of said members, and weld metal deposited in said openings only securing said plates to said members, certain of the openings being formed as notches in the edges of alternate plates.

7. A structural element of the class described, comprising in combination a series of metal members suitably supported and arranged in spaced parallel relation, a plurality of metal plates arranged in a common plane upon said members with the lines of their meeting edges resting upon the approximate surfaces of said members, said plates being provided with openings arranged at intervals and adjacent to the surfaces of said members, and weld metal deposited in said openings only securing said plates to said members, certain of the openings being formed as notches in the edges of the plates, the notches in any one plate being so positioned as to form the alternate openings along the meeting edges of the plates.

8. A structural element of the class described, comprising in combination a series of metal members suitably supported and arranged in spaced parallel relation, a plurality of metal plates arranged in a common plane upon said members with the lines of their meeting edges resting upon the approximate surfaces of said members, said plates being provided with openings arranged at intervals and adjacent to the surfaces of said members, and weld metal deposited in said openings only securing said plates to said members, the width of the plates and the spacing of the members being such that the edges of the plates meet in a line substantially central of said members, some of the openings for receiving the uniting weld metal being provided in the edges of the plates meeting over said members.

9. A structural element of the class described, comprising in combination a series of metal members suitably supported and arranged in spaced parallel relation, a plurality of metal plates arranged in a common plane upon said members with the lines of their meeting edges resting upon the approximate surfaces of said members, said plates being provided with openings arranged at intervals and adjacent to the surfaces of said members, and weld metal deposited in said openings only securing said plates to said members, the openings being formed as recesses in the outer edges of the plates.

RICHARD STRESAU.